United States Patent
Min et al.

(10) Patent No.: US 12,462,895 B2
(45) Date of Patent: Nov. 4, 2025

(54) T-CELL RECEPTOR REPERTOIRE SELECTION PREDICTION WITH PHYSICAL MODEL AUGMENTED PSEUDO-LABELING FOR PERSONALIZED MEDICINE DECISION MAKING

(71) Applicant: NEC Laboratories America, Inc., Princeton, NJ (US)

(72) Inventors: Renqiang Min, Princeton, NJ (US); Hans Peter Graf, South Amboy, NJ (US); Erik Kruus, Hillsborough, NJ (US); Yiren Jian, West Lebanon, NH (US)

(73) Assignee: NEC Corporation, Tokyo (JP)

( * ) Notice: Subject to any disclaimer, the term of this patent is extended or adjusted under 35 U.S.C. 154(b) by 559 days.

(21) Appl. No.: 17/969,883

(22) Filed: Oct. 20, 2022

(65) Prior Publication Data
US 2023/0129568 A1    Apr. 27, 2023

Related U.S. Application Data

(60) Provisional application No. 63/307,649, filed on Feb. 8, 2022, provisional application No. 63/270,257, filed on Oct. 21, 2021.

(51) Int. Cl.
*G16B 15/00* (2019.01)
*G06N 3/08* (2023.01)
(Continued)

(52) U.S. Cl.
CPC ............. *G16B 15/00* (2019.02); *G06N 3/08* (2013.01); *G16B 30/10* (2019.02); *G16B 40/20* (2019.02)

(58) Field of Classification Search
CPC ........ G16B 15/00; G16B 30/10; G16B 40/20; G16B 15/30; G06N 3/08; G06N 3/0442;
(Continued)

(56) References Cited

U.S. PATENT DOCUMENTS

| | | | |
|---|---|---|---|
| 2017/0211142 A1* | 7/2017 | Smargon | G16B 30/10 |
| 2019/0114544 A1* | 4/2019 | Sundaram | G06F 18/2155 |
| 2021/0256394 A1* | 8/2021 | Tymoshenko | G06N 3/123 |

OTHER PUBLICATIONS

Yang et al, Jointly learning T-cell receptor and transcriptomic information to decipher the immune response, Jun. 25, 2021, pp. 1-9. (Year 2021).*

(Continued)

*Primary Examiner* — Angelica Ruiz
(74) *Attorney, Agent, or Firm* — Joseph Kolodka; Vincent Duffy

(57) ABSTRACT

Systems and methods for predicting T-Cell receptor (TCR)-peptide interaction, including training a deep learning model for the prediction of TCR-peptide interaction by determining a multiple sequence alignment (MSA) for TCR-peptide pair sequences from a dataset of TCR-peptide pair sequences using a sequence analyzer, building TCR structures and peptide structures using the MSA and corresponding structures from a Protein Data Bank (PDB) using a MODELLER, and generating an extended TCR-peptide training dataset based on docking energy scores determined by docking peptides to TCRs using physical modeling based on the TCR structures and peptide structures built using the MODELLER. TCR-peptide pairs are classified and labeled as positive or negative pairs using pseudo-labels based on the docking energy scores, and the deep learning model is iteratively retrained based on the extended TCR-peptide training dataset and the pseudo-labels until convergence.

20 Claims, 10 Drawing Sheets

(51) Int. Cl.
*G16B 30/10* (2019.01)
*G16B 40/20* (2019.01)

(58) Field of Classification Search
CPC .... G06N 3/0455; G06N 3/0464; G06N 3/047; G06N 3/0475; G06N 3/084; G06N 3/096
See application file for complete search history.

(56) References Cited

OTHER PUBLICATIONS

Springer, I., Tickotsky, N., & Louzoun, Y. (Apr. 16, 2021). Contribution of t cell receptor alpha and beta cdr3, mhc typing, v and j genes to peptide binding prediction. Frontiers in immunology, 12, 664514.

Springer, I., Besser, H., Tickotsky-Moskovitz, N., Dvorkin, S., & Louzoun, Y. (Aug. 25, 2020). Prediction of specific TCR-peptide binding from large dictionaries of TCR-peptide pairs. Frontiers in immunology, 1803.

* cited by examiner

T-CELL RECEPTOR REPERTOIRE SELECTION PREDICTION WITH PHYSICAL MODEL AUGMENTED PSEUDO-LABELING FOR PERSONALIZED MEDICINE DECISION MAKING

RELATED APPLICATION INFORMATION

This application claims priority to U.S. Provisional App. No. 63/270,257, filed on Oct. 21, 2021, and U.S. Provisional App. No. 63/307,649, filed on Feb. 8, 2022, both incorporated herein by reference in their entirety.

BACKGROUND

Technical Field

The present invention relates to predicting T-cell receptor (TCR)-peptide interactions, and more particularly to predicting TCR-peptide interaction by training and utilizing a conditional variational autoencoder (cVAE) for TCR generation and classification using physical modeling and data-augmented pseudo labeling.

Description of the Related Art

Predicting interactions between the T-cell receptor (TCR) and peptide is important for personalized medicine and targeted vaccine in immunotherapy. Conventional systems and methods and current datasets for training deep learning models for such predicting are inaccurate, inefficient, and are constrained at least in part due to a lack of diverse TCRs and peptides in the datasets. Several deep learning approaches have been recently utilized to attempt to predict the interactions between TCRs and peptides, including utilizing Long short-term memory (LSTM) and an autoencoder to predict the interactions utilizing, for example, a β chain of complementarity determining region 3 (CDR3) (e.g., ERGO autoencoder), an α chain of CDR3, V and J gene, MHC type, T-cell type (e.g., ERGO II autoencoder), a Gaussian process, a stacked convolutional network for TCR-peptide predictions (e.g., NetTCR 1.0), and pairs α and β chain of CDR3 (e.g., NetTCR 2.0). However, these systems and methods suffer from the above-mentioned problem of being constrained at least in part due to a lack of diverse TCRs and peptides in the datasets, thus resulting in inefficient and inaccurate predictions of the interactions between TCRs and peptides.

SUMMARY

According to an aspect of the present invention, a method is provided for predicting T-Cell receptor (TCR)-peptide interaction, including training a deep learning model for the prediction of TCR-peptide interaction by determining a multiple sequence alignment (MSA) for TCR-peptide pair sequences from a dataset of TCR-peptide pair sequences using a sequence analyzer, building TCR structures and peptide structures using the MSA and corresponding structures from a Protein Data Bank (PDB) using MODELLER, and generating an extended TCR-peptide training dataset based on docking energy scores determined by docking peptides to TCRs using physical modeling based on the TCR structures and peptide structures built using MODELLER. TCR-peptide pairs are classified and labeled as positive or negative pairs using pseudo-labels based on the docking energy scores, and the deep learning model is iteratively retrained based on the extended TCR-peptide training dataset and the pseudo-labels until convergence.

According to another aspect of the present invention, a system is provided for predicting T-Cell receptor (TCR)-peptide interaction, and includes a processor operatively coupled to a non-transitory computer readable storage medium for training a deep learning model for the prediction of TCR-peptide interaction by determining a multiple sequence alignment (MSA) for TCR-peptide pair sequences from a dataset of TCR-peptide pair sequences using a sequence analyzer, building TCR structures and peptide structures using the MSA and corresponding structures from a Protein Data Bank (PDB) using MODELLER, and generating an extended TCR-peptide training dataset based on docking energy scores determined by docking peptides to TCRs using physical modeling based on the TCR structures and peptide structures built using MODELLER. TCR-peptide pairs are classified and labeled as positive or negative pairs using pseudo-labels based on the docking energy scores, and the deep learning model is iteratively retrained based on the extended TCR-peptide training dataset and the pseudo-labels until convergence.

According to another aspect of the present invention, a non-transitory computer readable storage medium including contents that are configured to cause a computer to perform a method for training a deep learning model for the prediction of TCR-peptide interaction by determining a multiple sequence alignment (MSA) for TCR-peptide pair sequences from a dataset of TCR-peptide pair sequences using a sequence analyzer, building TCR structures and peptide structures using the MSA and corresponding structures from a Protein Data Bank (PDB) using MODELLER, and generating an extended TCR-peptide training dataset based on docking energy scores determined by docking peptides to TCRs using physical modeling based on the TCR structures and peptide structures built using MODELLER. TCR-peptide pairs are classified and labeled as positive or negative pairs using pseudo-labels based on the docking energy scores, and the deep learning model is iteratively retrained based on the extended TCR-peptide training dataset and the pseudo-labels until convergence.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
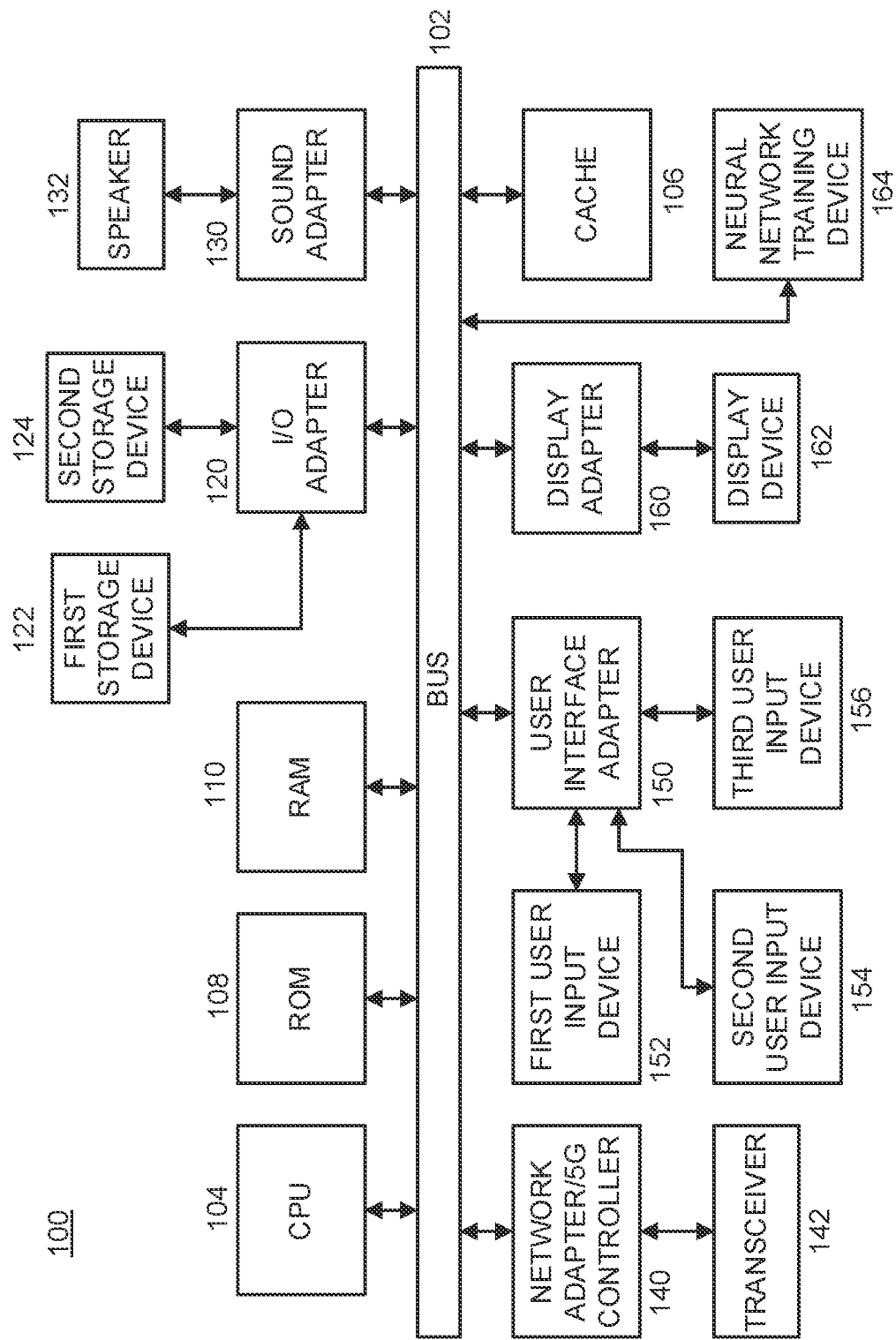
FIG. 1 is a block diagram illustratively depicting an exemplary processing system to which the present invention may be applied, in accordance with embodiments of the present invention.

In accordance with embodiments of the present invention, systems and methods are provided for predicting T-cell receptor (TCR)-peptide interaction by training and utilizing a conditional variational autoencoder (cVAE) for TCR generation and classification using physical modeling and data-augmented pseudo labeling.

In various embodiments, to combat the data scarcity issue, the present invention can extend the training dataset by physical modeling of TCR-peptide pairs to increase efficiency and accuracy of predicting TCR-peptide interactions (e.g., for use in personalized medicine and targeted vaccines in immunotherapy). In some embodiments, docking energies between auxiliary unknown TCR-peptide pairs can be utilized as additional example-label pairs to train a neural network learning model in a supervised fashion. An area under the curve (AUC) score of the prediction of the model can be further finetuned and improved by pseudo-labeling of such unknown TCR-peptide pairs, and retraining the model with those pseudo-labeled TCR-peptide pairs. Experimental results show that training a deep neural network with physical modeling and data-augmented pseudo-labeling significantly improves the accuracy and efficiency of the prediction of TCR-peptide interactions over baselines and conventional systems and methods, in accordance with aspects of the present invention.

In various embodiments, the present invention can be utilized to train a deep learning model for predicting TCR-peptide interactions from three (3) losses: a supervised cross-entropy loss from the given known TCR-peptide pair, a supervised cross-entropy loss based on docking energies of unknown TCR-peptide pairs, and a Kullback-Leibler (KL)-divergence loss from the pseudo-labeled unknown TCR-peptide pairs, in accordance with aspects of the present invention, as will be described in further detail herein below.

Predicting the interaction between a T-cell receptor (TCR) and a peptide-Major Histocompatibility Complex (pMHC) can be essential to developing repertoire-based biomarkers, (e.g., predicting whether the host is exposed to a target) and can be utilized for personalized medicine and targeted vaccines in immunotherapy, in accordance with aspects of the present invention. However, there is not enough experimental data available covering both a large number of peptides and a large number of TCRs, and thus, such predicting is conventionally computationally inefficient, and the results returned by conventional systems and methods can be inaccurate.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

Aspects of the present invention are described below with reference to flowchart illustrations and/or block diagrams of methods, systems and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

As employed herein, the term "hardware processor subsystem", "processor", or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. One or more neural network training devices 164 can be further coupled to system bus 102 by any appropriate connection system or method (e.g., Wi-Fi, wired, network adapter, etc.), in accordance with aspects of the present invention.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 400, 500, 600, 700, 800, and 1000, described below with respect to FIGS. 4, 5, 6, 7, 8, and 10, respectively, are systems for implementing respective embodiments of the present invention. Part or all of processing system 100 may be implemented in one or more of the elements of systems 400, 500, 600, 700, 800, and 1000, in accordance with aspects of the present invention.

Further, it is to be appreciated that processing system 100 may perform at least part of the methods described herein including, for example, at least part of methods 200, 300, 400, 500, 600, 700, 800, and 900, described below with respect to FIGS. 2, 3, 4, 5, 6, 7, 8, and 9, respectively.

Similarly, part or all of systems 400, 500, 600, 700, 800, and 1000 may be used to perform at least part of methods 200, 300, 400, 500, 600, 700, 800, and 900 of FIGS. 2, 3, 4, 5, 6, 7, 8, and 9, respectively, in accordance with aspects of the present invention.

Figure 2:
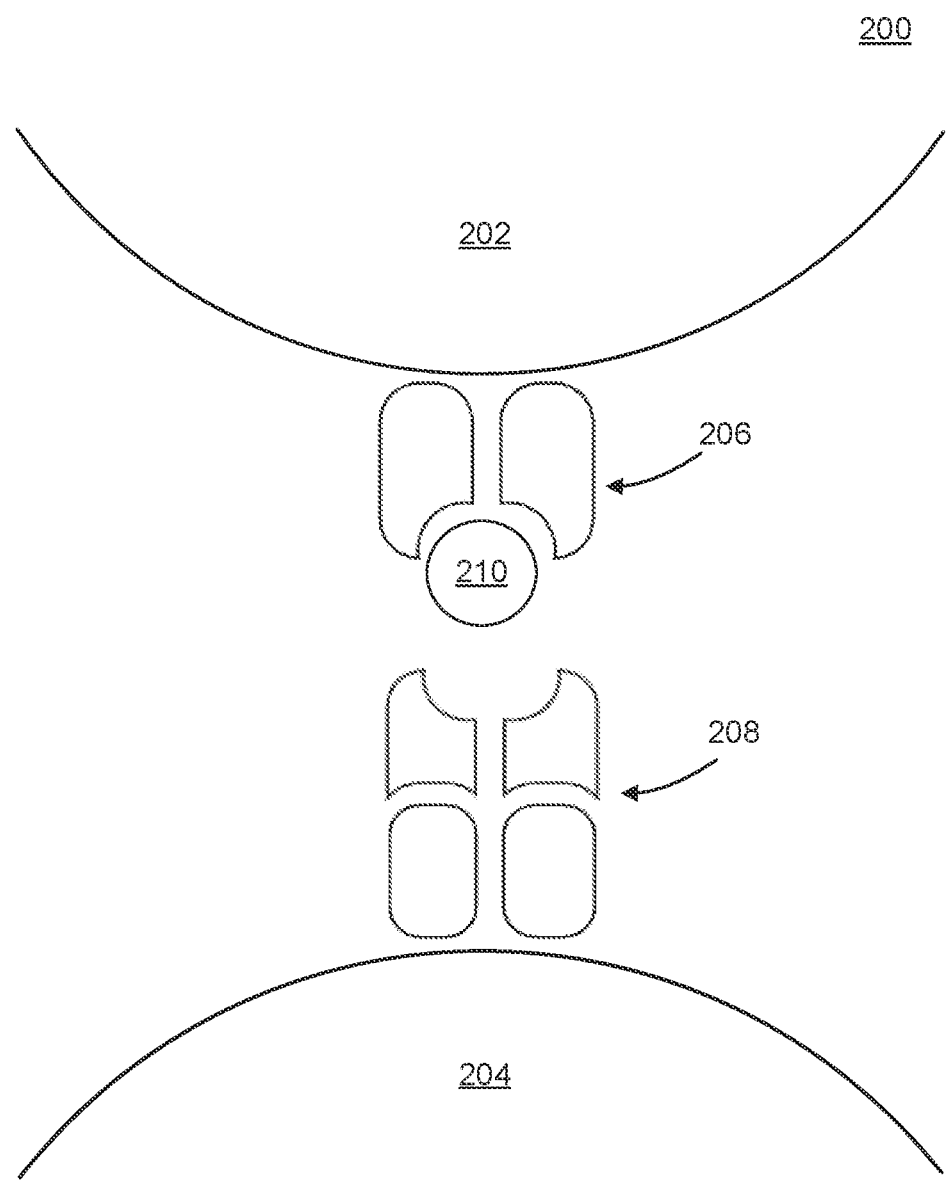
FIG. 2 is a diagram illustratively depicting an exemplary high-level view of a method for T-cell receptor (TCR) and peptide bonding, in accordance with embodiments of the present invention.

Referring now to FIG. 2, a diagram showing an exemplary high-level view of a method 200 for T-cell receptor (TCR) and peptide bonding is illustratively depicted in accordance with embodiments of the present invention.

Initially, it is noted that recognition of peptide/Major histocompatibility complex (MHC) 206 by TCRs 208 is an important interaction performed by an adaptive immune system of a person. A TCR 208 is a protein complex found on the surface of T cells 204 (or T-lymphocytes), that is responsible for recognizing fragments of antigen (e.g., in a tumor or virus infected cell 202) as peptides 210 bound to MHC molecules 206. In some embodiments, tumor cells 202 can be eliminated by determining and utilizing tumor-antigen specific T-cells 204 by targeting TCR 208-peptide 210/MHC 206 interaction on a surface of a tumor cell 202, in accordance with aspects of the present invention.

Although large databases for TCRs 208 and peptides 210 are available, in practice, information regarding binding specificity for TCR-peptides is limited and is not sufficient for most TCR-peptide binding determinations. In some embodiments, a deep learning model can be trained for determining information regarding binding specificity and predicting TCR-peptide interactions from three (3) losses: a supervised cross-entropy loss from the given known TCR-peptide pair, a supervised cross-entropy loss based on docking energies of unknown TCR-peptide pairs, and a Kullback-Leibler (KL)-divergence loss from the pseudo-labeled unknown TCR-peptide pairs, in accordance with aspects of the present invention.

In various embodiments, the introduction of $\mathcal{D}_{TCRdb}$ makes the learning problem a semi-supervised setting. Besides pseudo-labeling by physical modeling (described in further detail herein below), well established semi-supervised methods can be leveraged and utilized to further improve the results. Pseudo-labeling has been proven to be a successful technique in semi-supervised learning. In accordance with various embodiments, an algorithm which first labels unlabeled examples with a model first trained on the labeled dataset can be utilized and then the model can be retrained with a labeled training dataset with the extended pseudo-labeled examples, in accordance with aspects of the present invention.

In an illustrative embodiment, following training with only $\mathcal{L}_{label}$ can lead to a model $\Theta_{teacher}$. For a given TCR t' sampled from $\mathcal{D}_{TCRddb}$ and peptide p sampled from $\mathcal{D}_{train}$, p'ob'=$f_{\Theta_{teacher}}$(t', p'), where prob' represents the output probability of the teacher model that is used as the pseudo-label for TCR-peptide pair (t', p'). The learning objective function for pseudo-labeled examples by a teacher model can then be represented as follows:

pred'=$f_\Theta(t',p')$ $\mathcal{L}_{pseudo-labeled}$=$KL$-div(pred',prob')

with the final total loss 320 being determined by a combination of three losses as follows:

$\mathcal{L}_{total}$=$\alpha\mathcal{L}_{labeled}$ 314+$\beta\mathcal{L}_{physical}$ 318+$\gamma\mathcal{L}_{pseudo-labeled}$ 316, in accordance with aspects of the present invention.

Figure 3:
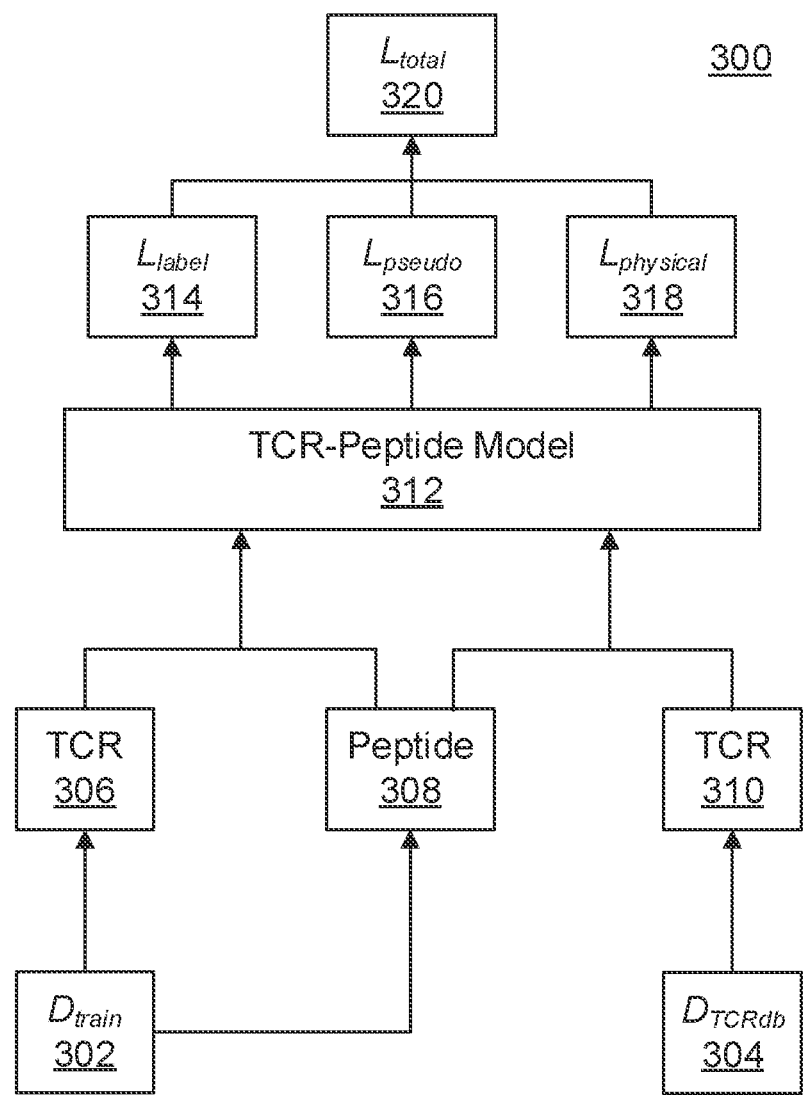
FIG. 3 is a diagram illustratively depicting a high-level method for training a deep learning model for predicting T-cell receptor (TCR)-peptide interactions, in accordance with embodiments of the present invention.

Referring now to FIG. 3, a diagram showing a high-level view of a method 300 for training a deep learning model for predicting T-cell receptor (TCR)-peptide interactions is illustratively depicted in accordance with embodiments of the present invention.

In some embodiments, a TCR-peptide model 312 (e.g., ERGO) can learn and be trained by three (3) losses to determine a loss total 320 ($L_{total}$), including a standard cross entropy loss 314 ($L_{label}$) from examples of a labeled dataset 304 (e.g., $D_{TCRdb}$) (which can include TCRs from block 310), a KL-divergence loss 316 ($L_{pseudo}$) from pseudo-labeled examples (e.g., by a teacher model, which can include as input TCRs 306 and/or peptides 308 from a training dataset ($D_{train}$) in block 302), and a cross-entropy loss based on physical properties 318 ($L_{physical}$) between TCRs 306, 310 and peptides 308, in accordance with aspects of the present invention.

In accordance with various embodiments, for simplicity of illustration, let t denote a TCR sequence, p a peptide sequence, and x=(t, p) denote a TCR-peptide pair. A TCR-peptide dataset $\mathcal{D}$ : $\{(x_i, y_i)\}$ where i=1, 2, ..., n, can be utilized, where n represents the size of the dataset D, $x_i$ represents a TCR-peptide pair, and $y_i$ can be either 1 (indicating a positive pair) or 0 (indicating a negative pair). A goal of the present invention can be to learn a model 312 from $\mathcal{D}_{train}$ 302 that performs well on a testing dataset $\mathcal{D}_{test}$ (not shown), where $\mathcal{D}_{train}$ 302 and $\mathcal{D}_{test}$ are a split of dataset $\mathcal{D}$. The above-discussed data scarcity issue, which is present in $\mathcal{D}_{train}$ 302, can limit the model's generalization on $\mathcal{D}_{test}$. Thus, to further improve the performance, the present invention can leverage a TCR dataset 304 ($\mathcal{D}_{TCRdb}$ $\{t_j\}$), where j=1, 2, ..., N and N represents a number of TCRs 310 in $\mathcal{D}_{TCRdb}$ 304. It can be assumed that N>>n, and that the TCR 310 in $\mathcal{D}_{TCRdb}$ 304 has no known interaction with peptides in $\mathcal{D}_{train}$, in accordance with aspects of the present invention.

It is noted that the TCR-peptide model 312 discussed herein (ERGO-I) can be utilized as a base model for illustrative purposes and experimental results, but it to be appreciated that other sorts of TCR-peptide models and/or modellers can be utilized in accordance with various embodiments of the present invention. ERGO-II improves over ERGO-I by further considering auxiliary information, (e.g., a chain of CDR3, V and J gene, MHC types and T-cell types), but ERGO-I is utilized herein to illustrate that the present invention can finetune and improve any machine learning model for predicting interaction of two molecules by executing physical modeling between TCRs and peptides. ERGO-I is a general framework that can be adapted to any protein-protein interaction predictions whereas ERGO-II is only applicable to TCR-peptide interaction predictions.

The present invention is not limited to just TCR-peptide interactions, and thus, a model such as ERGO-I (or similar) can be utilized as a base model, in accordance with aspects of the present invention. It is to be appreciated that although the system and method 300 is described herein below as utilizing an ERGO-I model as a base model, as discussed above, the present principles can be applied using any sort of model as a base model, in accordance with aspects of the present invention.

Figure 4:
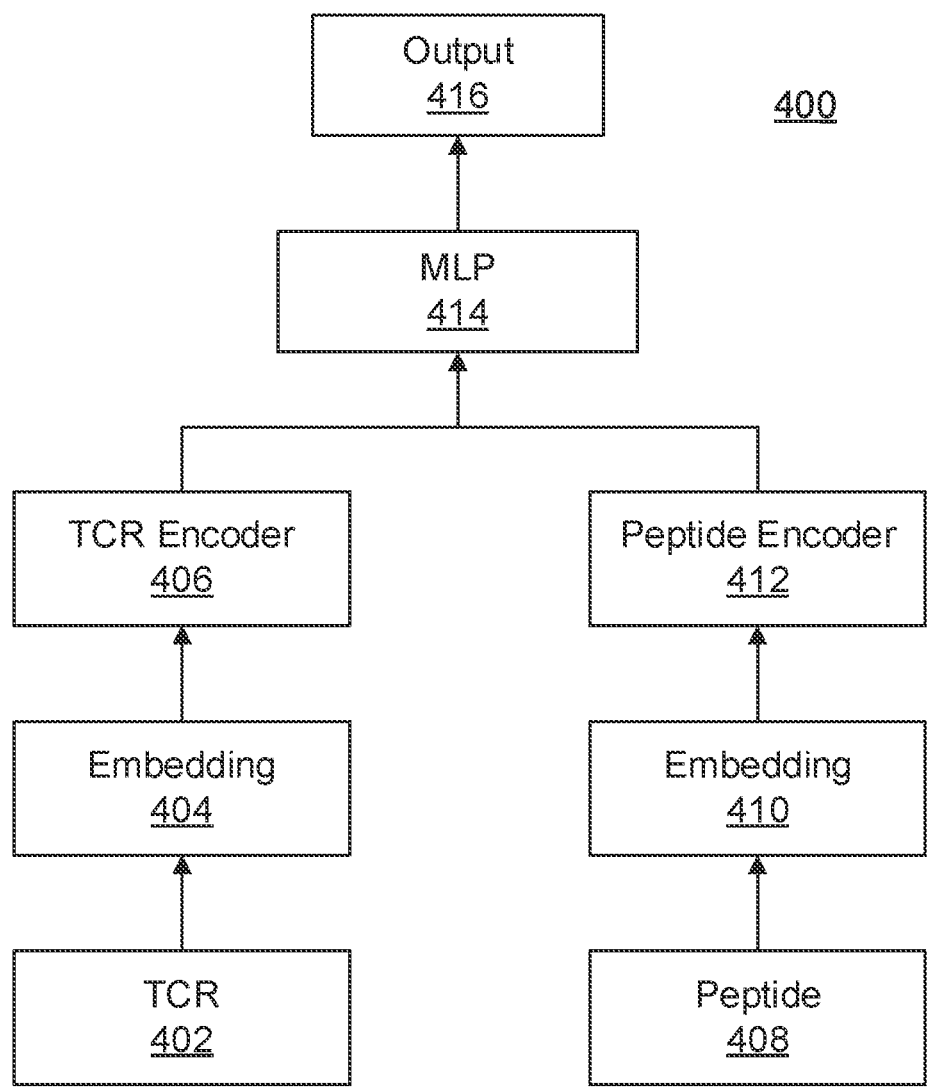
FIG. 4 is a block/flow diagram illustratively depicting a system and method for training a deep learning model for predicting T-cell receptor (TCR)-peptide interactions with multiple encoders, in accordance with embodiments of the present invention.

Referring now to FIG. 4, a system and method 400 for training a deep learning model for predicting T-cell receptor (TCR)-peptide interactions with multiple encoders is illustratively depicted in accordance with embodiments of the present invention.

In accordance with various embodiments, and for simplicity of illustration, a base model (e.g., TCR-peptide model, adaptable to any protein-protein interaction predictions) for fair experimental comparisons will be referred to as ERGO herein below. In some embodiments, ERGO can include two separate encoders $f_{\theta_{TCR}}$ 406 and $f_{\theta_{pep}}$ 412 for TCRs 402 and peptides 408, respectively. The encoder 406 for TCRs 402 can include stacked MLPs, and can be pre-trained by an auto-encoding loss, whereas the encoder 412 for peptides 408 can be parameterized by a LSTM, in accordance with aspects of the present invention. As an example, for $x=(t, p)\in\mathcal{D}_{train}$, embedding TCRs in block 404 and embedding peptides in block 410 can be computed by the following:

$$e_{TCR}=f_{\theta TCR}(t)$$

$$e_{peptide}=f_{\theta pep}(p)$$

A fully connected MLP 414 $f_{\theta_{clf}}$ can be attached to the concatenated embeddings of TCRs 404 and peptides 410 to perform a final classification and generate a prediction as output in block 416 as follows:

$$pred=f_{\theta_{clf}}(concat(e_{TCR}, e_{peptide})),$$

where pred represents a prediction, and a classification loss is a binary cross entropy (BCE) loss, in accordance with various aspects of the present invention. For simplicity of illustration, hereinafter it can be denoted that:

$$pred=f_{\Theta}(t,p)$$

where $f_\Theta$ represents a full model that includes $f_{\theta_{clf}}$, $f_{\theta_{TCR}}$, $f_{\theta_{pep}}$ al and the final classification loss can be represented by the cross-entropy loss between the prediction pred and the label y for an exemplary TCR-peptide pair $x=(t, p)$, in accordance with aspects of the present invention.

Figure 5:
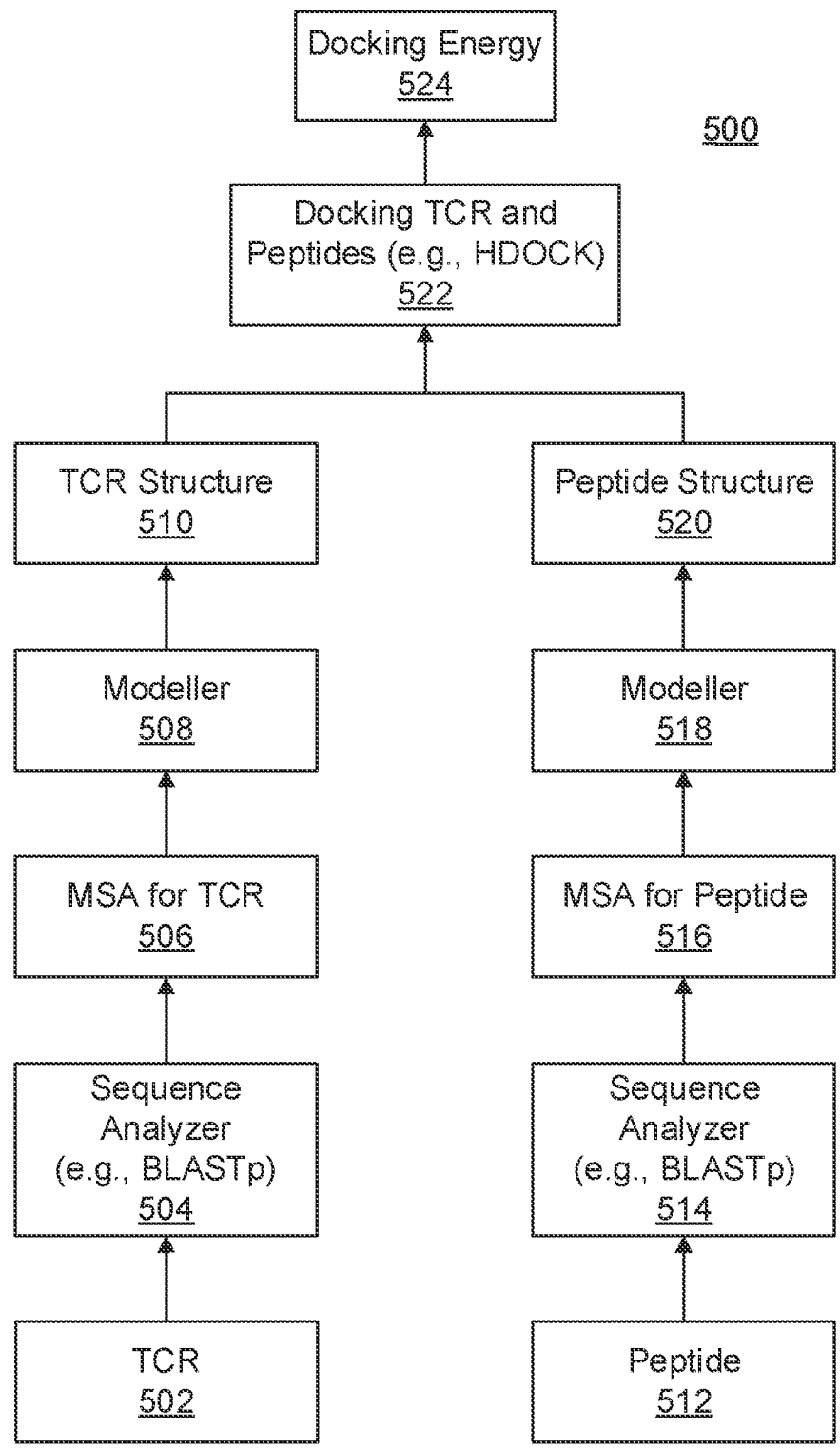
FIG. 5 is a block/flow diagram illustratively depicting a system and method for predicting T-cell receptor (TCR)-peptide interactions by training a deep learning model and computing docking energy, in accordance with embodiments of the present invention.

Referring now to FIG. 5, a system and method 500 for predicting T-cell receptor (TCR)-peptide interactions by training a deep learning model and computing docking energy is illustratively depicted in accordance with embodiments of the present invention.

In various embodiments, to improve the lack of diverse TCR 502 and peptide 512 pairs in a supervised training dataset $\mathcal{D}_{train}$, the present invention can utilize physical properties between auxiliary TCRs and peptides to extend the training dataset $\mathcal{D}_{train}$, in accordance with aspects of the present invention.

In some embodiments, for a given sequence of TCR 502 and peptides 512, a sequence analyzer 504, 514 (e.g., BLASTp) can be utilized to determine a MSA for TCRs in block 506 and/or a MSA for peptides in block 516 for the sequence, in accordance with aspects of the present invention. In various embodiments, a large TCR database $\mathcal{D}_{TCRdb}$ with diverse TCRs 502 can be utilized, but these TCRs 502 have no known interaction with the peptides 512 in $\mathcal{D}_{train}$. The docking energy 524 between a TCR 502 and peptide 512 can be selected as an indication of interaction, and docking energy 524 reflects the binding affinity between molecules by treating molecules as rigid bodies. Docking of a peptide 512 and TCR 502 can determine a configuration of two rigid bodies with the minimal energy by moving the peptide 512 around the surface of TCR 502, and a comparatively smaller docking energy can indicate a positive pair of the given TCR 502 and peptide 512, in accordance with aspects of the present invention.

Note that docking 522 (e.g., using HDock or similar) is a physics-based modeling that first can utilize the known structures of TCRs 502 and peptides 512. In some embodiments, given a TCR sequence t' sampled from $\mathcal{D}_{TCRdb}$ and a peptide sequence p' from $\mathcal{D}_{train}$, structures of the TCR 510 t' and structures of the peptide 520 p can be built by using a sequence analyzer 504, 514 (e.g., BLASTp) to find homologous sequences with known structures. Docking can be described as a computational method developed to predict the structures of protein complex (e.g., dimer of two molecules). Docking can search the configurations of a complex by minimizing an energy scoring function 524, and the determined final docking energy 524 between a TCR and peptide can be utilized as a surrogate binding label for this TCR-peptide pair, in accordance with aspects of the present invention.

For ease of illustration, HDock will be described as the docking algorithm utilized, but any other docking algorithm or method can be utilized in accordance with aspects of the present invention. For a TCR/peptide sequence without structure, HDock can first use a fast protein sequence searching algorithm to find the multiple-sequence-alignment (MSA) of the target sequence, and corresponding structures in Protein Data Bank (PDB). Then HDock can execute docking with the constructed structures from MSA and known structures of homologous sequences. The learning algorithm can leverage the final docking score as a surrogate label for a TCR-peptide pair, and a threshold can be utilized to partition TCR-peptide pairs into categories of negative pairs, positive pairs, and other, which will be described in further detail herein below.

In blocks 508 and 518, a MODELLER 508, 518 can be utilized for building structures for TCRs 510 and peptides 520, in accordance with aspects of the present invention. In some embodiments, MSA and the corresponding structures from a Protein Data Bank (PDB) can be utilized by a MODELLER 508, 518 for building the structures of the TCR/peptide. Finally, a docking of TCR and peptides (e.g., using HDock) can be executed in block 522 with the given structures of the TCR 510 and peptide 520 for computing docking energies in block 524.

In some embodiments, once the structures of TCRs 510 and peptides 520 have been determined, docking (e.g., using HDock or similar) can be executed to dock TCRs and peptides in block 522, in accordance with aspects of the present invention. In this way, for example, 80 K TCR-peptide pairs with docking energy scores 524 can be generated. Pairs can be pseudo-label with the bottom 25% energy scores indicative of positive pairs and those with the top 25% energy scores indicative of negative pairs. Thus, a dataset can be generated, and can include pseudo-labeled by docking energies: $\mathcal{D}_{dock}$. For $x',y'\in\mathcal{D}_{dock}$, where y' is the pseudo-label by docking, the learning objective can be represented as follows:

$$pred\ d'=f_\Theta(t',p')$$

$$\mathcal{L}_{physical}=CrossEntropy(pred', y')$$

For convenience and simplicity of illustration, pairs ((t',p'), pred d') can be utilized to form a new dataset $\mathcal{D}_{physical}$ for later use, in accordance with aspects of the present invention.

Figure 6:
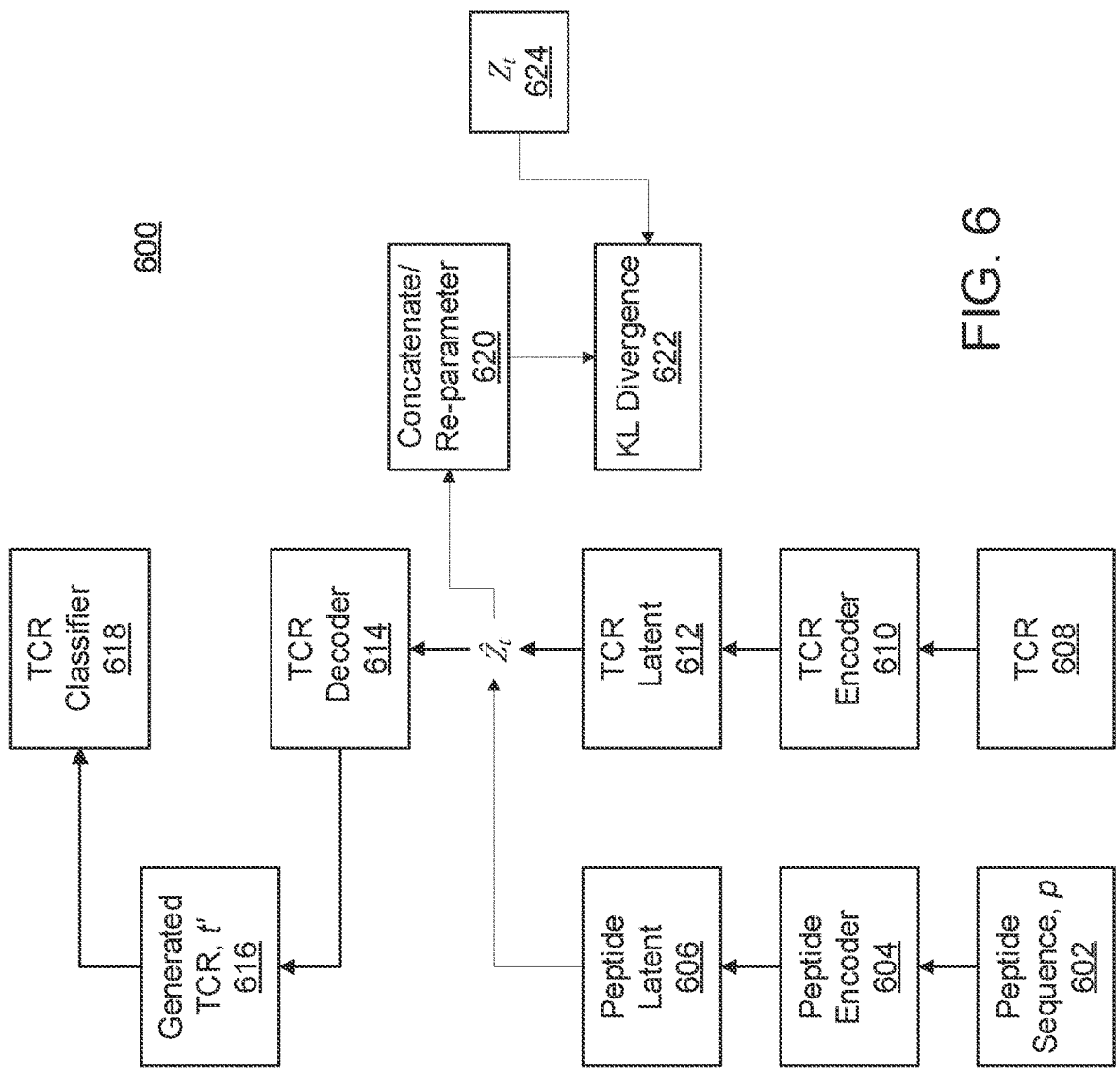
FIG. 6 is a block/flow diagram illustratively depicting a system and method for predicting T-cell receptor (TCR)-peptide interaction by training a conditional variational autoencoder (cVAE) for TCR generation and classification, in accordance with embodiments of the present invention.

Referring now to FIG. 6, a system and method 600 for predicting T-cell receptor (TCR)-peptide interaction by training a conditional variational autoencoder (cVAE) for TCR generation and classification is illustratively depicted in accordance with embodiments of the present invention.

In various embodiments, a cVAE can be trained for TCR generation condition on peptides using various datasets (e.g., MCPAS, VDJdb, etc.) using a peptide sequence 602, p, and TCR 608 as input. A peptide encoder 604 can be utilized to generate latent peptides in block 606 and a TCR encoder 610 can be utilized to generate latent TCR in block 612. The latent peptide 606 and latent TCR 612 can be modeled (e.g., as Gaussians) using a mean and variance as a function (e.g., $\hat{Z}_t$) which can be utilized for concatenation/reparameterization in block 620 and as input for KL divergence 622 in combination with a latent variable 4 624, in accordance with aspects of the present invention. A TCR decoder 614 can be utilized to generate a TCR, t' in block 616, which can be classified using a TCR classifier 618, and a gradient can enforce the generated TCRs 616 to be positive binds to conditioned peptides, in accordance with aspects of the present invention.

Figure 7:
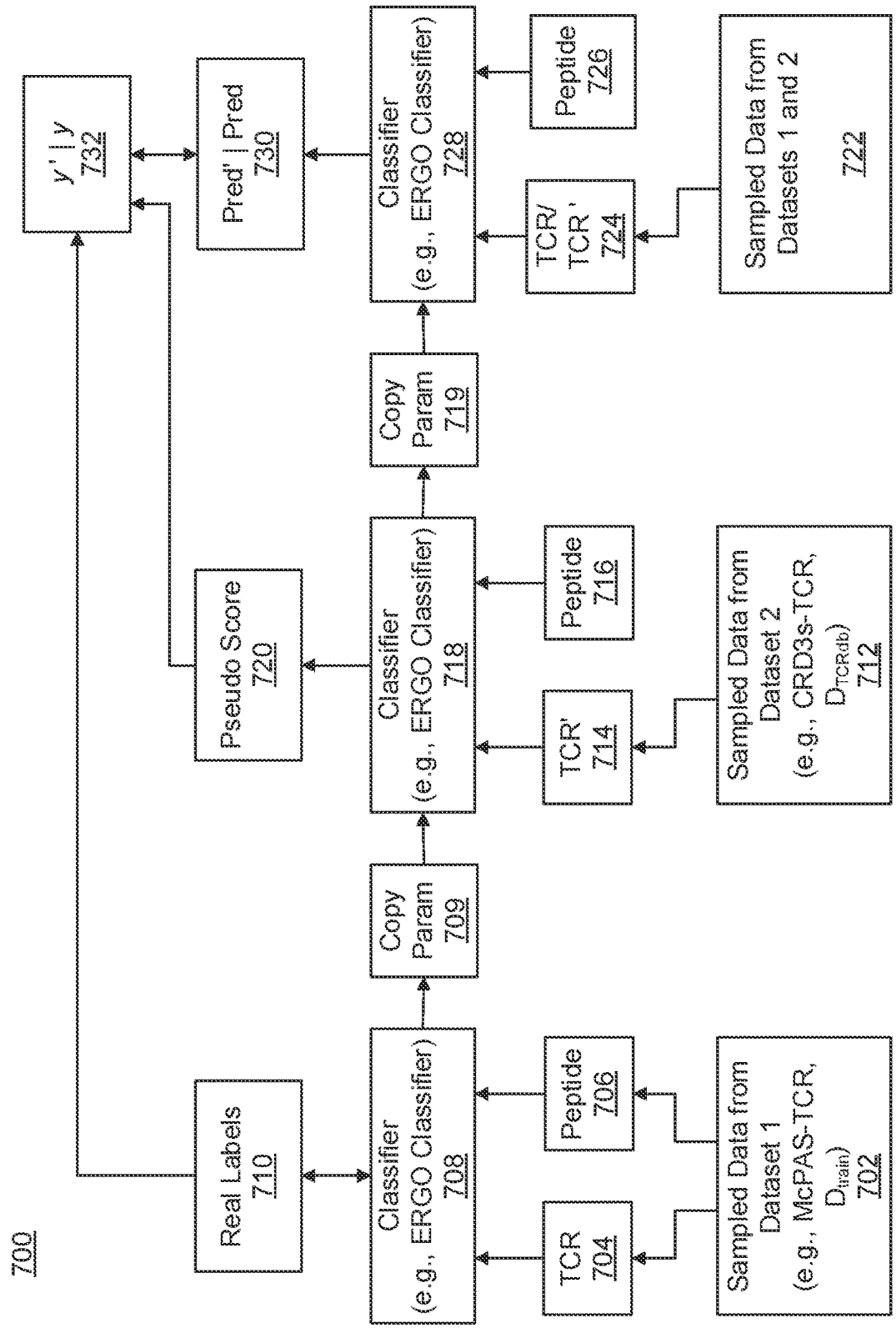
FIG. 7 is a block/flow diagram illustratively depicting a system and method for predicting T-cell receptor (TCR)-peptide interaction by expanding a training dataset using pseudo-labeling, in accordance with embodiments of the present invention.

Referring now to FIG. 7, a system and method 700 for predicting T-cell receptor (TCR)-peptide interaction by expanding a training dataset using pseudo-labeling is illustratively depicted in accordance with embodiments of the present invention.

In one embodiment, a classifier 708 (e.g., ERGO classifier) can be pre-trained using limited labeled data (e.g., from McPAS-TCR) $D_{train}$ from block 702 for TCRs 704 and peptides 706 to generate real labels 710. Parameters can be copied in block 709 for use by a next classifier (e.g., ERGO) model in block 718. The initial learned model 708 can be utilized as a teacher model for generating pseudo-scores and/or pseudo-labeling TCR peptide pairs (e.g., TCR' 714, peptide 716) by a classifier 718 (e.g., ERGO) in block 720 using data from an auxiliary dataset 712 (e.g., from CRD3s-TCR) $D_{TCRdb}$, in accordance with aspects of the present invention.

In some embodiments, the parameters can be copied in block 719 for use by a next classifier (e.g., ERGO) model in block 728. The model 728 can be retrained using sampled data 722 from the original dataset $D_{train}$ from block 702, and data from the extended pseudo-labeled dataset $D_{TCRdb}$ from block 712. Input to the classifier 728 can include TCR/TCR' from block 724 and peptide from block 726. A prediction (pred'|pred) can be generated in block 730, and the real labels 710 and pseudo labels 720 can be utilized with the predictions 730 to generate a final docking score as output y'|y in block 732 based on the combined sampled dataset input from block 722, including TCR'/TCR from block 724 and peptides from block 726, in accordance with aspects of the present invention.

Figure 8:
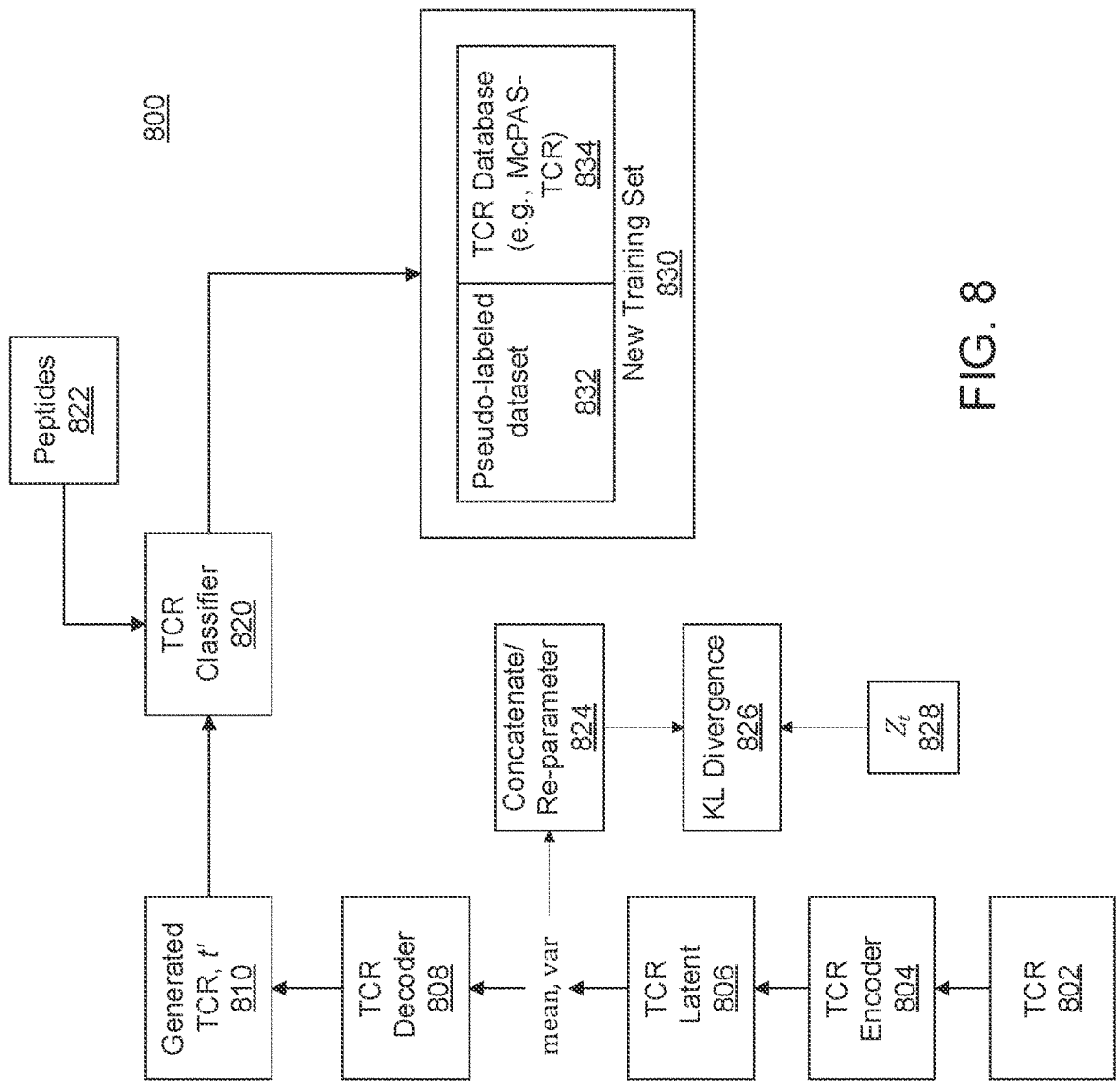
FIG. 8 is a block/flow diagram illustratively depicting a system and method for predicting T-cell receptor (TCR)-peptide interaction by training a conditional variational autoencoder (cVAE) for TCR generation and classification, and expanding a training dataset using pseudo-labeling, in accordance with embodiments of the present invention.

Referring now to FIG. 8, a system and method 800 for predicting T-cell receptor (TCR)-peptide interaction by training a conditional variational autoencoder (cVAE) for TCR generation and classification, and expanding a training dataset using pseudo-labeling is illustratively depicted in accordance with embodiments of the present invention.

In an embodiment, TCRs 802 from multiple databases (e.g., McPAS-TCR, BM_data_CDR3s-TCR, etc.) can be received by a TCR encoder 804 to generate latent TCRs in block 806. The latent TCRs 806 can be modeled (e.g., as Gaussians) using a mean and variance function, which can be utilized for concatenation/reparameterization in block 824 and as input for KL divergence 826 in combination with a latent variable $Z_t$ 828, in accordance with aspects of the present invention.

In some embodiments, a TCR decoder 808 can be utilized to generate a TCR, t' in block 810, which can be classified using a TCR classifier 820, which can receive further input of peptides 822 from one of the above-discussed multiple databases (e.g., McPAS-TCR). The TCR classifier 820 can generate a new training set 830 for additional training to further fine-tune and improve the performance of the classifier 820 for TCR-peptide binding predictions based on the generation model and pseudo labeling, in accordance with aspects of the present invention.

In accordance with various embodiments, note that while learning from physical modeling can effectively extend the training dataset, the success of the learning can also on the quality of the physical modeling. The model can be learned such that the auxiliary learning from the physical modeling can be optimized for the primary learning objective by, for example, meta-learning that minimizes a validation loss. This meta-learning algorithm can introduce a gradient-on-gradient learning procedure that is time consuming. However, in accordance with aspects of the present invention, to improve processing speed and accuracy, instead of minimizing a validation loss, it can be approximated by minimizing the training loss of a current batch (e.g., optimize the learning from physical modeling such that learning from this auxiliary objective will reduce the training loss on the current batch), in accordance with aspects of the present invention.

As an example, for each training iteration with a batch (x, y), the loss $\mathcal{L}_{labeled}$ and $\mathcal{L}_{pseudo\text{-}labeled}$ can be computed first, parameters of the model can be updated accordingly, and the parameters can be denoted as $\Theta_{t-1}$. Then, the loss $\mathcal{L}_{physical}$ can be computed, and the model can be updated one step further to be $\Theta_t$. If it is determined that:

$$\text{CrossEntropy}(f_{\Theta_{t-1}}(x),y) \leq \text{CrossEntropy}(f_{\Theta_t}(x),y)$$

(e.g., learning the current batch with physical modeling leads to larger training error), then the model can be switched back to $\Theta_{t-1}$ to reduce training errors (e.g., the parameters of the model are not updated if learning from physical modeling does not help the training process), in accordance with aspects of the present invention.

Figure 9:
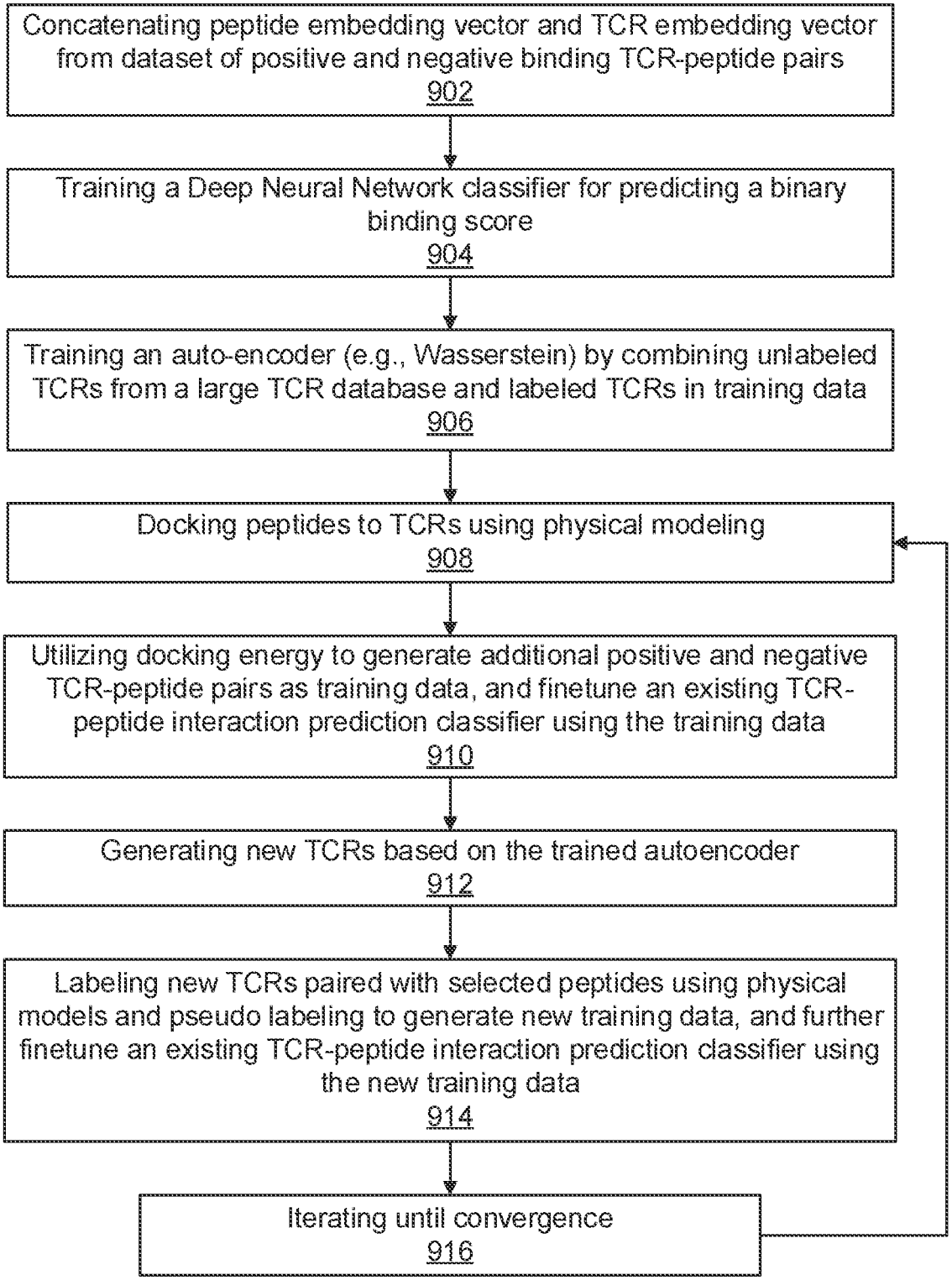
FIG. 9 is a block/flow diagram illustratively depicting a method for predicting and classifying T-cell receptor (TCR)-peptide interaction by training and utilizing a neural network, in accordance with embodiments of the present invention.

Referring now to FIG. 9, a method 900 for predicting and classifying T-cell receptor (TCR)-peptide interaction by training and utilizing a neural network is illustratively depicted in accordance with embodiments of the present invention.

In some embodiments, in block 902, a peptide embedding vector and TCR embedding vector can be concatenated from a dataset of positive and negative binding TCR-peptide pairs. A deep neural network (DNN) classifier can be trained for predicting a binary binding score in block 904, and an auto-encoder (e.g., Wasserstein) can be trained by combining unlabeled TCRs from a large TCR database (e.g., TCRdb) and labeled TCRs from training data in block 906. In block 908, peptides can be docked to TCRs using physical modeling. In block 910, docking energy can be utilized to generate additional positive and negative TCR-peptide pairs as training data, and to fine-tune an existing TCR-peptide interaction prediction classifier using the training data.

In some embodiments, new TCRs can be generated based on the trained autoencoder in block 912, and new TCRs paired with selected peptides can be labeled using physical models and pseudo labeling to generate new training data, and to further finetune an existing TCR-peptide interaction prediction classifier using the new training data. In accordance with various embodiments, pseudo-labeling (e.g., self-training) can correspond to learning a first (e.g., teacher) model on a labeled dataset, and using the learned first (e.g., teacher) model to pseudo-label the unlabeled dataset. A new model can be learned from the joint dataset of the original labeled dataset and the extended pseudo-labeled dataset, in accordance with aspects of the present invention.

In some embodiments, learning using the trained DNN from block 904 can include using unlabeled examples by matching the predictions of the model on weakly-augmented examples and heavily-augmented examples, and learning pseudo-labels by gradient-based metalearning (e.g., the pseudo-labels can be optimized for minimizing validation loss of a target task). The present invention can be viewed as a semi-supervised problem by using a large database (e.g., TCRdb) for TCR sequences, and can assign pseudo-scores to unknown pairs (e.g., by a teacher model) and/or by assigning pseudo-labels from determined properties of physical modeling of TCR-peptide pairs, in accordance with aspects of the present invention. In some embodiments, the steps of blocks 908, 910, 912, and/or 914 can be iterated until convergence in block 916, in accordance with aspects of the present invention.

Figure 10:
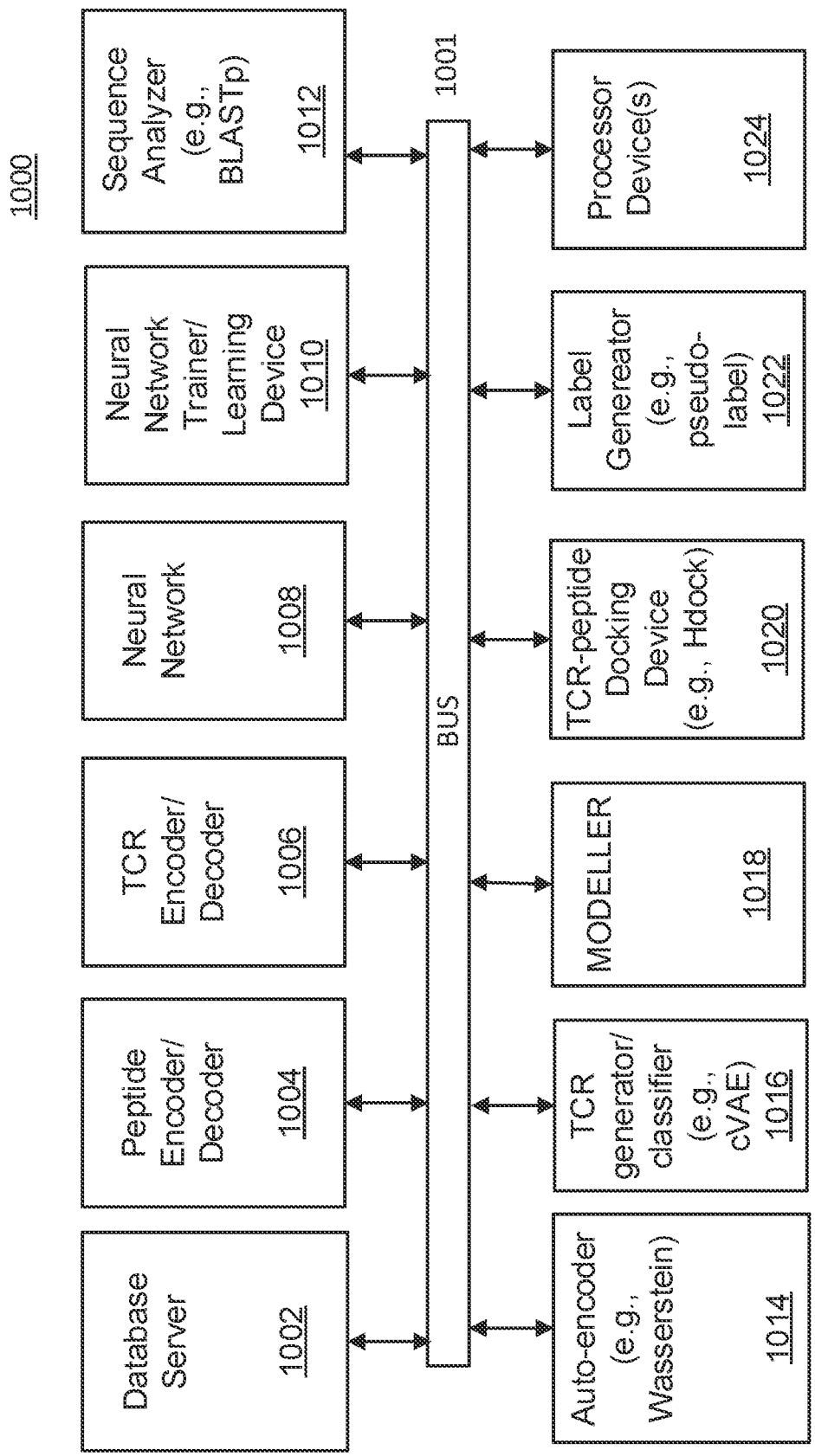
FIG. 10 is a diagram illustratively depicting an exemplary system for predicting and classifying T-cell receptor (TCR)-peptide interaction by training and utilizing a neural network, in accordance with embodiments of the present invention.

Referring now to FIG. 10, an exemplary system 1000 for predicting and classifying T-cell receptor (TCR)-peptide interaction by training and utilizing a neural network is illustratively depicted in accordance with an embodiment of the present invention.

In some embodiments, one or more database servers 1002 can include large amounts of unlabeled and/or labeled TCRs and/or peptides (or other data) for use as input, in accordance with aspects of the present invention. A peptide encoder 1004 can be utilized to generate latent peptides, and a TCR encoder/decoder 1006 can be utilized to generate latent TCR (encoder) and a new TCR, t' (decoder), in accordance with aspects of the present invention. A neural network 1008 can be utilized and can include a neural network trainer/learning device 1010, which can include one or more processor devices 1024, for performing training of one or more models (e.g., ERGO), and a sequence analyzer 1012 (e.g., BLASTp), which can be utilized to determine a MSA for TCRs and/or a MSA for peptides for one or more sequences of TCRs and/or peptides.

In various embodiments, an auto-encoder 1014 (e.g., Wasserstein) can be trained by combining unlabeled TCRs from a large TCR database (e.g., TCRdb) and labeled TCRs from training data, and can be utilized for generation of new TCRs using a TCR generator/classifier 1016. The TCR generator/classifier 1016 can classify one or more new TCRs, t' generated using the latent TCR from the TCR encoder/decoder 1006, and can enforce, using a gradient, the generated TCRs to be positive binds to conditioned peptides, in accordance with aspects of the present invention. A MODELLER 1018 can be utilized for building structures for TCRs and peptides, and in some embodiments, MSA and the corresponding structures from a Protein Data Bank (PDB) can be utilized by a MODELLER 1018 for building the structures of the TCR/peptide, in accordance with aspects of the present invention.

In some embodiments, a TCR-peptide docking device 1020 (e.g., HDock) can be utilized to execute a docking of TCR and peptides using the TCR and peptide structures built by the MODELLER 1018 to calculate docking energies, in accordance with aspects of the present invention. In an embodiment, a label generator 1022 can generate real labels for the TCRs generated by the TCR generator/classifier 1016 (e.g., ERGO classifier) by, for example, pre-training the classifier 1016 using limited labeled data (e.g., from McPAS-TCR) $D_{train}$ for TCRs and peptides to generate real labels. In an embodiment, a label generator 1022 can generate pseudo-labels for the TCRs generated by the TCR generator/classifier 1016 (e.g., ERGO classifier) by, for example, using an initial learned model as a teacher model for generating pseudo-scores, and pseudo-labeling TCR peptide pairs using data from an auxiliary dataset (e.g., from CRD3s-TCR) $D_{TCRdb}$, in accordance with aspects of the present invention.

In the embodiment shown in FIG. 10, the elements thereof are interconnected by a bus 1001. However, in other embodiments, other types of connections can also be used. Moreover, in an embodiment, at least one of the elements of system 1000 is processor-based and/or a logic circuit and can include one or more processor devices 1024. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 1000 are readily determined by one of ordinary skill in the art, given the teachings of the present principles provided herein, while maintaining the spirit of the present principles.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for predicting T-Cell receptor (TCR)-peptide interaction, comprising:
   training a deep learning model for the predicting TCR-peptide interaction, the training comprising:
   determining a multiple sequence alignment (MSA) for a plurality of TCR-peptide pair sequences from a dataset of TCR-peptide pair sequences using a sequence analyzer;

building TCR structures and peptide structures using the MSA and corresponding structures from a Protein Data Bank (PDB) using a MODELLER;
generating an extended TCR-peptide training dataset based on docking energy scores determined by docking peptides to TCRs using physical modeling based on the TCR structures and peptide structures built using the MODELLER; and
classifying and labeling TCR-peptide pairs as positive or negative pairs using pseudo-labels based on the docking energy scores; and
iteratively retraining the deep learning model based on the extended TCR-peptide training dataset and the pseudo-labels until convergence.

2. The method as recited in claim 1, wherein the dataset of TCR-peptide pairs includes positive and negative binding TCR-peptide pairs.

3. The method as recited in claim 1, wherein the classifying and labeling the TCR-peptide pairs further comprises pseudo-labeling the TCR-peptide pairs with a top x percentage of the energy scores as negative pairs, and a bottom y percentage of the energy scores as positive pairs.

4. The method as recited in claim 1, further comprising concatenating a peptide embedding vector and a TCR embedding vector from the dataset of TCR-peptide pair sequences.

5. The method as recited in claim 1, further comprising training an autoencoder by combining unlabeled TCRs from a TCR database and labeled TCRs from the training data.

6. The method as recited in claim 1, wherein the deep learning model is learned based on a standard cross-entropy loss from the plurality of TCR-peptide pair sequences, a divergence loss from the pseudo-labeled TCR-peptide pairs, and a cross-entropy loss based on physical properties between TCRs and peptides using physical modeling.

7. The method as recited in claim 6, wherein a final total loss ($L_{total}$) is determined as follows:

$$L_{total}=L_{labeled}+L_{pseudo\text{-}labeled}+L_{physical}$$

where $L_{labeled}$ represents the standard cross-entropy loss from the plurality of TCR-peptide pair sequences, $L_{pseudo\text{-}labeled}$ represents a divergence loss from the pseudo-labeled TCR-peptide pairs, and $L_{physical}$ represents the cross-entropy loss based on physical properties.

8. A system for predicting T-Cell receptor (TCR)-peptide interaction, comprising:
a processor operatively coupled to a non-transitory computer readable storage medium, the processor being configured for:
training a deep learning model for the predicting TCR-peptide interaction, the training comprising:
determining a multiple sequence alignment (MSA) for a plurality of TCR-peptide pair sequences from a dataset of TCR-peptide pair sequences using a sequence analyzer;
building TCR structures and peptide structures using the MSA and corresponding structures from a Protein Data Bank (PDB) using a MODELLER;
generating an extended TCR-peptide training dataset based on docking energy scores determined by docking peptides to TCRs using physical modeling based on the TCR structures and peptide structures built using the MODELLER; and
classifying and labeling TCR-peptide pairs as positive or negative pairs using pseudo-labels based on the docking energy scores; and
iteratively retraining the deep learning model based on the extended TCR-peptide training dataset and the pseudo-labels until convergence.

9. The system as recited in claim 8, wherein the dataset of TCR-peptide pairs includes positive and negative binding TCR-peptide pairs.

10. The system as recited in claim 8, wherein the classifying and labeling the TCR-peptide pairs further comprises pseudo-labeling the TCR-peptide pairs with a top x percentage of the energy scores as negative pairs, and a bottom y percentage of the energy scores as positive pairs.

11. The system as recited in claim 8, wherein the processor is further configured for concatenating a peptide embedding vector and a TCR embedding vector from the dataset of TCR-peptide pair sequences.

12. The system as recited in claim 8, wherein the processor is further configured for training an autoencoder by combining unlabeled TCRs from a TCR database and labeled TCRs from the training data.

13. The system as recited in claim 8, wherein the deep learning model is learned based on a standard cross-entropy loss from the plurality of TCR-peptide pair sequences, a divergence loss from the pseudo-labeled TCR-peptide pairs, and a cross-entropy loss based on physical properties between TCRs and peptides using physical modeling.

14. The system as recited in claim 13, wherein a final total loss ($L_{total}$) is determined as follows:

$$L_{total}=L_{labeled}+L_{pseudo\text{-}labeled}+L_{physical}$$

where $L_{labeled}$ represents the standard cross-entropy loss from the plurality of TCR-peptide pair sequences, $L_{pseudo\text{-}labeled}$ represents a divergence loss from the pseudo-labeled TCR-peptide pairs, and $L_{physical}$ represents the cross-entropy loss based on physical properties.

15. A non-transitory computer readable storage medium comprising a computer readable program operatively coupled to a processor device for predicting T-Cell receptor (TCR)-peptide interaction, wherein the computer readable program when executed on a computer causes the computer to perform the steps of:
training a deep learning model for the predicting the TCR-peptide interaction, the training comprising:
determining a multiple sequence alignment (MSA) for a plurality of TCR-peptide pair sequences from a dataset of TCR-peptide pair sequences using a sequence analyzer;
building TCR structures and peptide structures using the MSA and corresponding structures from a Protein Data Bank (PDB) using a MODELLER;
generating an extended TCR-peptide training dataset based on docking energy scores determined by docking peptides to TCRs using physical modeling based on the TCR structures and peptide structures built using the MODELLER; and
classifying and labeling TCR-peptide pairs as positive or negative pairs using pseudo-labels based on the docking energy scores; and
iteratively retraining the deep learning model based on the extended TCR-peptide training dataset and the pseudo-labels until convergence.

16. The non-transitory computer readable storage medium as recited in claim 15, wherein the dataset of TCR-peptide pairs includes positive and negative binding TCR-peptide pairs.

17. The non-transitory computer readable storage medium as recited in claim 15, wherein the classifying and labeling the TCR-peptide pairs further comprises pseudo-labeling the TCR-peptide pairs with a top x percentage of the energy scores as negative pairs, and a bottom y percentage of the energy scores as positive pairs.

18. The non-transitory computer readable storage medium as recited in claim 15, further comprising concatenating a peptide embedding vector and a TCR embedding vector from the dataset of TCR-peptide pair sequences.

19. The non-transitory computer readable storage medium as recited in claim 15, wherein the deep learning model is learned based on a standard cross-entropy loss from the plurality of TCR-peptide pair sequences, a divergence loss from the pseudo-labeled TCR-peptide pairs, and a cross-entropy loss based on physical properties between TCRs and peptides using physical modeling.

20. The non-transitory computer readable storage medium as recited in claim 19, wherein a final total loss ($L_{total}$) is determined as follows:

$$L_{total} = L_{labeled} + L_{pseudo-labeled} + L_{physical}$$

where $L_{labeled}$ represents the standard cross-entropy loss from the plurality of TCR-peptide pair sequences, $L_{pseudo-labeled}$ represents a divergence loss from the pseudo-labeled TCR-peptide pairs, and $L_{physical}$ represents the cross-entropy loss based on physical properties.

* * * * *